US012422920B2

(12) United States Patent
Chrzanowski et al.

(10) Patent No.: US 12,422,920 B2
(45) Date of Patent: Sep. 23, 2025

(54) IMAGE PROJECTION DEVICE AND CONTROL METHOD THEREOF

(71) Applicant: Samsung Electronics Co., Ltd., Suwon-si (KR)

(72) Inventors: Cezary Chrzanowski, Warsaw (PL); Franciszek Jelowicki, Warsaw (PL); Szymon Zygula, Warsaw (PL); Junghyun Byun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/798,315

(22) Filed: Aug. 8, 2024

(65) Prior Publication Data

US 2025/0181137 A1     Jun. 5, 2025

Related U.S. Application Data

(63) Continuation of application No. PCT/KR2024/011325, filed on Aug. 1, 2024.

(30) Foreign Application Priority Data

Nov. 30, 2023   (KR) .................. 10-2023-0171839

(51) Int. Cl.
*G06F 3/01*     (2006.01)
*G06T 7/521*    (2017.01)
(Continued)

(52) U.S. Cl.
CPC .............. *G06F 3/011* (2013.01); *G06T 7/521* (2017.01); *G06T 11/00* (2013.01); *H04N 9/3179* (2013.01);
(Continued)

(58) Field of Classification Search
CPC .......... G06F 3/011; G06T 7/521; G06T 11/00; G06T 2207/10024; G06T 2207/30196;
(Continued)

(56) References Cited

U.S. PATENT DOCUMENTS 6,219,099 B1 *  4/2001  Johnson ............... H04N 9/3147
                                               348/E17.005
8,195,006 B2    6/2012  Klemmer et al.
(Continued)

FOREIGN PATENT DOCUMENTS

JP      2005-070687 A     3/2005
JP      2005-269010 A     9/2005
(Continued)

OTHER PUBLICATIONS

International Search Report dated Nov. 5, 2024, issued in International Application No. PCT/KR2024/011325.

*Primary Examiner* — Stephen G Sherman
(74) *Attorney, Agent, or Firm* — Jefferson IP Law, LLP

(57) ABSTRACT

An image projection device and a control method thereof are provided. The image projection device includes a first camera, a second camera, a light source, an image processor, memory storing one or more computer programs and one or more processors communicatively coupled to the first camera, the second camera, the light source, the image processor, and the memory, wherein the one or more computer programs include computer-executable instructions that, when executed by the one or more processors individually or collectively, cause the image projection device to obtain property information about properties of a surface onto which an image is projected, obtain viewpoint information about a viewpoint from which a user views the image, generate a virtual image based on the property information and the viewpoint information, and project the image onto (Continued)

the surface based on the virtual image and a location of the user.

16 Claims, 11 Drawing Sheets

(51) Int. Cl.
*G06T 11/00* (2006.01)
*H04N 9/31* (2006.01)

(52) U.S. Cl.
CPC .............. *G06T 2207/10024* (2013.01); *G06T 2207/30196* (2013.01)

(58) Field of Classification Search
CPC .............. H04N 9/3179; H04N 9/3147; H04N 9/3182; H04N 9/3185; H04N 9/3194
See application file for complete search history.

(56) References Cited

U.S. PATENT DOCUMENTS

| | | |
|---|---|---|
| 2010/0054580 A1 | 3/2010 | Miyoshi et al. |
| 2010/0321408 A1* | 12/2010 | Miceli .................. G09G 3/001 |
| | | 345/643 |
| 2013/0229396 A1* | 9/2013 | Huebner ............... G06F 3/1446 |
| | | 345/207 |
| 2016/0100143 A1* | 4/2016 | Kreiner ................ H04N 9/3147 |
| | | 348/745 |
| 2020/0273193 A1* | 8/2020 | Anderberg ................ G06T 5/50 |

FOREIGN PATENT DOCUMENTS

| | | |
|---|---|---|
| JP | 2007-299080 A | 11/2007 |
| KR | 10-1408295 B1 | 6/2014 |
| KR | 10-2017-0013704 A | 2/2017 |

\* cited by examiner

IMAGE PROJECTION DEVICE AND CONTROL METHOD THEREOF

CROSS-REFERENCE TO RELATED APPLICATION(S)

This application is a continuation application, claiming priority under § 365 (c), of an International application No. PCT/KR2024/011325, filed on Aug. 1, 2024, which is based on and claims the benefit of a Korean patent application number 10-2023-0171839, filed on Nov. 30, 2023, in the Korean Intellectual Property Office, the disclosure of which is incorporated by reference herein in its entirety.

TECHNICAL FIELD

The disclosure relates to an image projection device and a control method thereof.

BACKGROUND ART

Image projection devices may be electronic devices that project an image onto a surface located away from the image projection device. For example, an image projection device may be a beam projector that displays an image or a video by projecting the same onto a screen or a wall located away from the image projection device. An image projection device may project a large-sized image onto a certain surface other than a display, thus enabling a large number of viewers to watch the image with less space constraints.

An image projection device may project an image assuming that a surface onto which the image is projected is a flat and uniformly white surface. For example, an image projection device may project an image assuming that the screen or wall is flat and uniformly white. When the surface onto which an image is projected is folded, at least one curve is formed on the surface onto which an image is projected, or the surface onto which an image is projected includes at least one color, the image projected by an image projection device may be distorted. Accordingly, when an image projection device projects an image onto a wall having a bent part, a surface having a curve, such as a curtain, or a surface having a color, distortion may occur in the projected image.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an image projection device and a control method thereof.

Additional aspects will be set forth in part in the description which follows and, in part, will be apparent from the description, or may be learned by practice of the presented embodiments.

In accordance with an aspect of the disclosure, an image projection device is provided. The image projection device includes a first camera, a second camera, a light source, an image processor, memory storing one or more computer programs, and one or more processors communicatively coupled to the first camera, the second camera, the light source, the image processor, and the memory, wherein the one or more computer programs include computer-executable instructions that, when executed by the one or more processors individually or collectively, cause the image projection device to obtain property information about properties of a surface onto which an image is projected, obtain viewpoint information about a viewpoint from which a user views the image, generate a virtual image based on the property information and the viewpoint information, and project an image onto a surface based on the virtual image and a location of the user.

In accordance with another aspect of the disclosure, a control method performed by an image projection device is provided. The control method includes obtaining, by the image projection device, property information about properties of a surface onto which an image is projected, obtaining, by the image projection device, viewpoint information about a viewpoint from which a user views the image, generating, by the image projection device, a virtual image based on the property information and the viewpoint information, and projecting, by the image projection device, an image onto a surface based on the virtual image and a location of the user.

In accordance with another aspect of the disclosure, one or more non-transitory computer-readable storage media storing one or more computer programs including computer-executable instructions that, when executed by one or more processors of an image projection device individually or collectively, cause the image projection device to perform operations are provided. The operations include obtaining, by the image projection device, property information about properties of a surface onto which an image is projected, obtaining, by the image projection device, viewpoint information about a viewpoint from which a user views the image, generating, by the image projection device, a virtual image based on the property information and the viewpoint information, and projecting, by the image projection device, an image onto a surface based on the virtual image and a location of the user.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
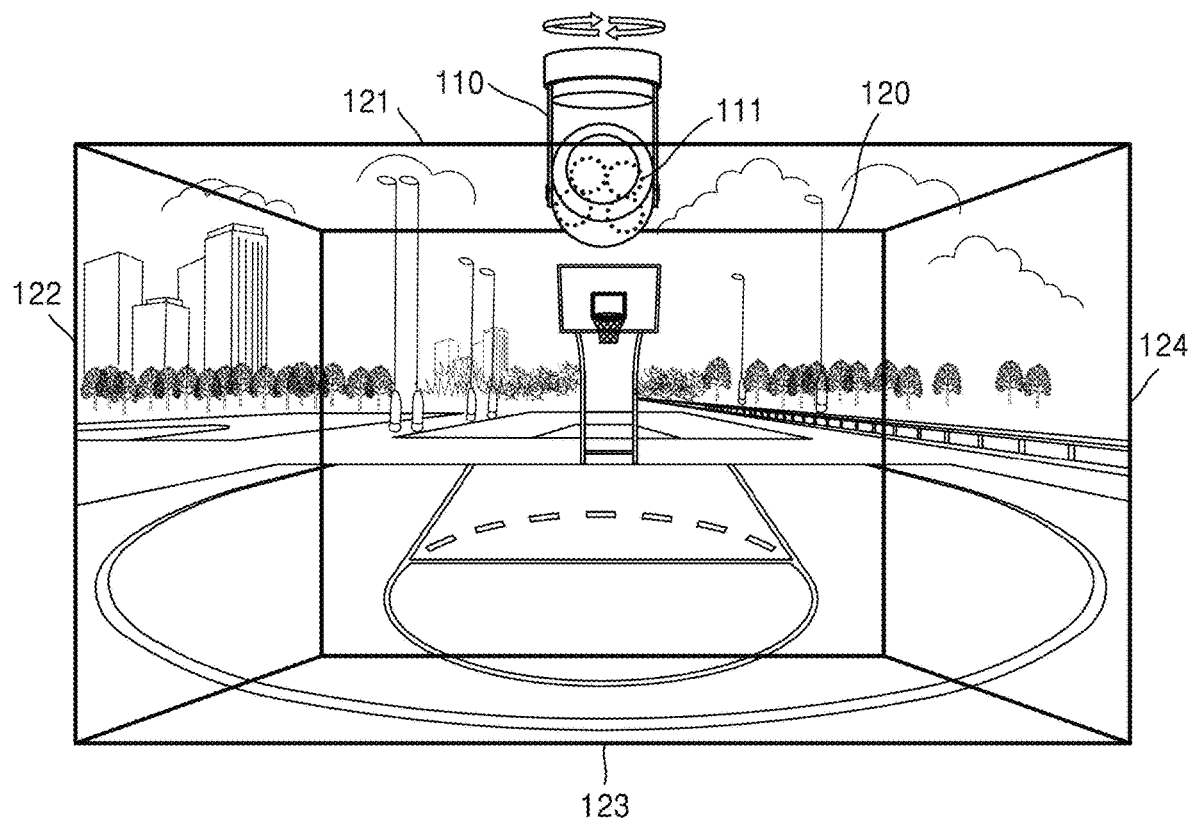
FIG. 1 illustrates an image projection device projecting an image according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure have been selected from currently widely used general terms in consideration of the functions in the disclosure. However, the terms may vary according to the intention of one of ordinary skill in the art, case precedents, and the advent of new technologies. Furthermore, for special cases, meanings of the terms selected by the applicant are described in detail in the description section. Accordingly, the terms used in the disclosure are defined based on their meanings in relation to the contents discussed throughout the specification, not by their simple meanings.

When a part may "include" or "comprise" a certain constituent element, unless specified otherwise, it may not be construed to exclude another constituent element but may be construed to further include other constituent elements. Furthermore, terms such as " . . . portion," " . . . unit," " . . . module," and " . . . block" stated in the disclosure may signify a unit to process at least one function or operation and the unit may be embodied by hardware, software, or a combination of hardware and software.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

FIG. 1 illustrates that an image projection device projects an image according to an embodiment of the disclosure.

Referring to FIG. 1, an image projection device 110 may be an electronic device that projects an image onto a surface located away from the image projection device 110. For example, the image projection device 110 may be a beam projector that projects and displays an image or a video on a screen or a wall located away from the image projection device 110. The image projection device 110 may project a large-sized image onto a certain surface other than a display, thus enabling a large number of viewers to watch the image with less space constraints. In particular, the image projection device 110 according to an embodiment of the disclosure may improve the quality of an image projected onto a surface under various environments.

The image projection device 110 according to an embodiment of the disclosure may include a plurality of built-in projectors 111. The image projection device 110 may include at least one built-in camera. The image projection device 110 may have a projection area of 180° to 360°. The image projection device 110 may be disposed on the ceiling or wall indoors. For example, the image projection device 110 may be attached to the ceiling indoors. For example, the image projection device 110 may be attached to a side surface wall indoors.

The image projection device 110 according to an embodiment of the disclosure may project an image onto a surface with a bent part. For example, the image projection device 110 according to an embodiment of the disclosure may project an image onto a wall having bent parts by an upper surface, a lower surface, a left side surface, and a right side surface, thereby projecting an image including a main part 120, a first edge part 121, a second edge part 122, a third edge part 123, and a fourth edge part 124. The image projection device 110 may reduce distortion occurring due to the bent parts in the projected image.

The image projection device 110 according to an embodiment of the disclosure may seamlessly stich an image projected from the plurality of built-in projectors 111. The image projection device 110 according to an embodiment of the disclosure may correct the projected image by reflecting the location of a user in real time.

Figure 2:
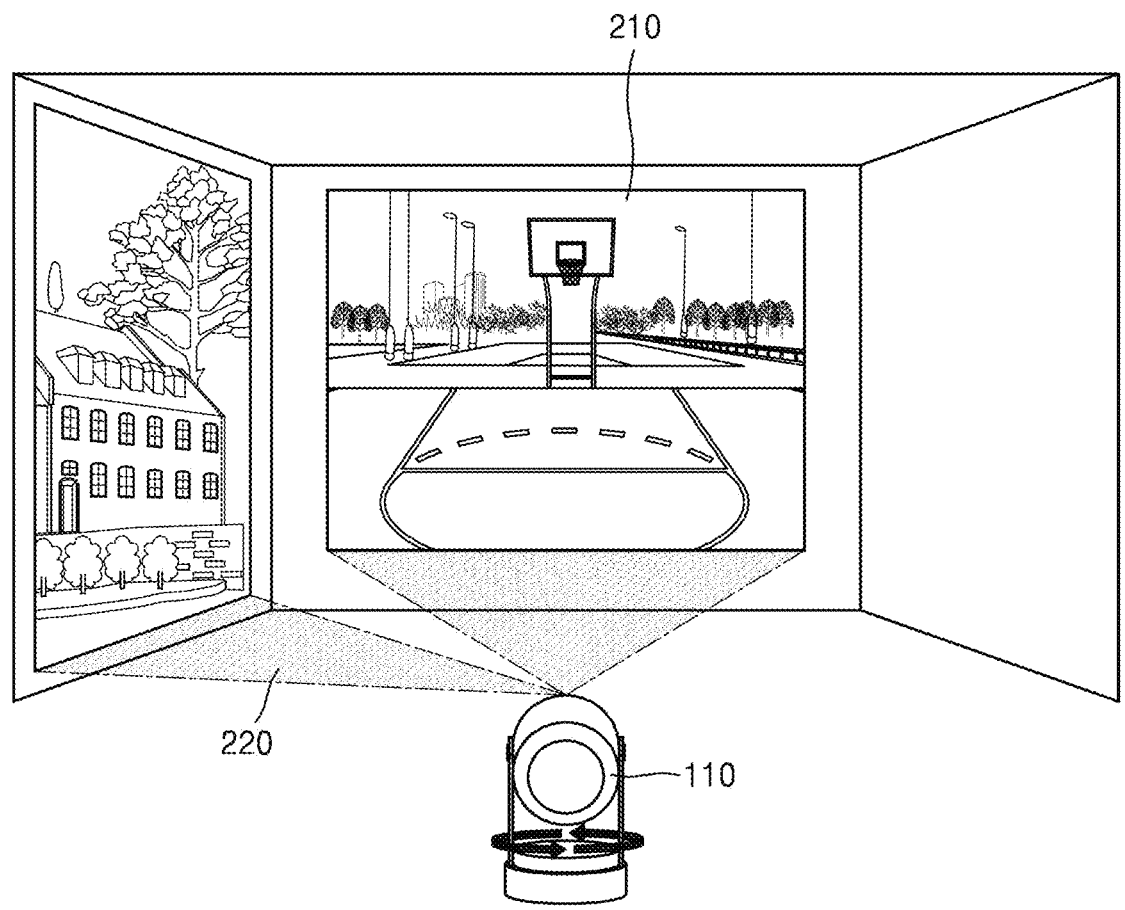
FIG. 2 illustrates an image projection device projecting an image according to an embodiment of the disclosure.

FIG. 2 illustrates that an image projection device projects an image according to an embodiment of the disclosure.

Referring to FIG. 2, an image projection device 110 according to an embodiment of the disclosure may be disposed on the floor indoors. For example, the image projection device 110 may be installed on the floor indoors. For example, the image projection device 110 may be installed on a desk, a table, or a dresser indoors.

The image projection device 110 according to an embodiment of the disclosure may project an image onto at least one surface. For example, the image projection device 110 may project a first image 210 onto a front side wall and project a second image 220 onto a left wall. The image projection device 110 may project different images onto a plurality of surfaces. The image projection device 110 may project images considering the position and angle of each of a plurality of surfaces.

The image projection device 110 according to an embodiment of the disclosure may project an image onto a surface located away therefrom in various external environments. For example, the image projection device 110 may project an image onto a surface from external environments which may comprise at least one of various illuminances and various colors. The image projection device 110 may compensate for the distortion of an image occurring due to an external environment. The image projection device 110 may project an image in various external environments so that a restriction occurring due to an external environment during use of the image projection device 110 may be reduced.

In particular, the image projection device 110 according to an embodiment of the disclosure may project an image onto various surfaces. For example, the image projection device 110 may project an image onto a wall having a bent part, a surface having a curve, such as a curtain, or a surface having a color. The image projection device 110 may compensate for distortion of an image occurring due to a surface onto which an image is projected. The image projection device 110 may project an image onto a surface other than a flat and uniformly white surface, thereby increasing the scope of use of the image projection device 110.

Figure 3:
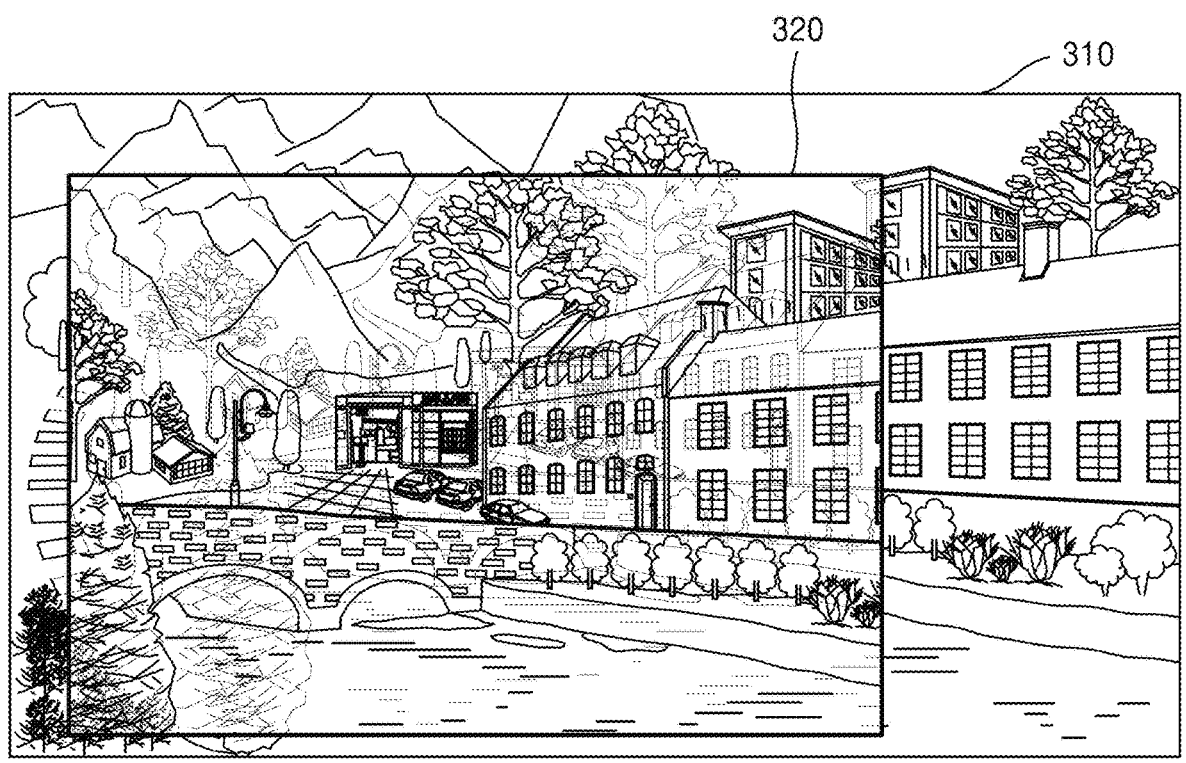
FIG. 3 illustrates an image projected by an image projection device, which is distorted according to an embodiment of the disclosure.

FIG. 3 illustrates that an image projected by an image projection device is distorted according to an embodiment of the disclosure.

An image projection device may be a non-linear device that projects an image in the form that is best viewed when a user perceives the image. An image projection device may project an image onto a surface, considering that the human eyes perceive the color and brightness by a non-linear type and method. An image projection device may include a plurality of image processors to process an image to be projected onto a surface. An image projection device may process an image assuming that an image being projected is projected onto a flat and uniformly white surface.

Referring to FIG. 3, when an image projection device projects an image onto an irregular surface, distortion may occur in a projected image. For example, when an image projection device projects an image onto a surface having a curve and transmittance, such as a curtain, a main image 310 that is originally to be projected and a distortion image 320 that is projected by the surface may be displayed to be overlapped with each other. In addition, when an image projection device projects an image onto a wall having a bent part, an irregular surface, or a surface having a color, an image that is originally to be projected may be distorted and displayed on the surface.

The image projection device 110 according to an embodiment of the disclosure may adopt a method to solve the problem shown in FIG. 3.

Figure 4:
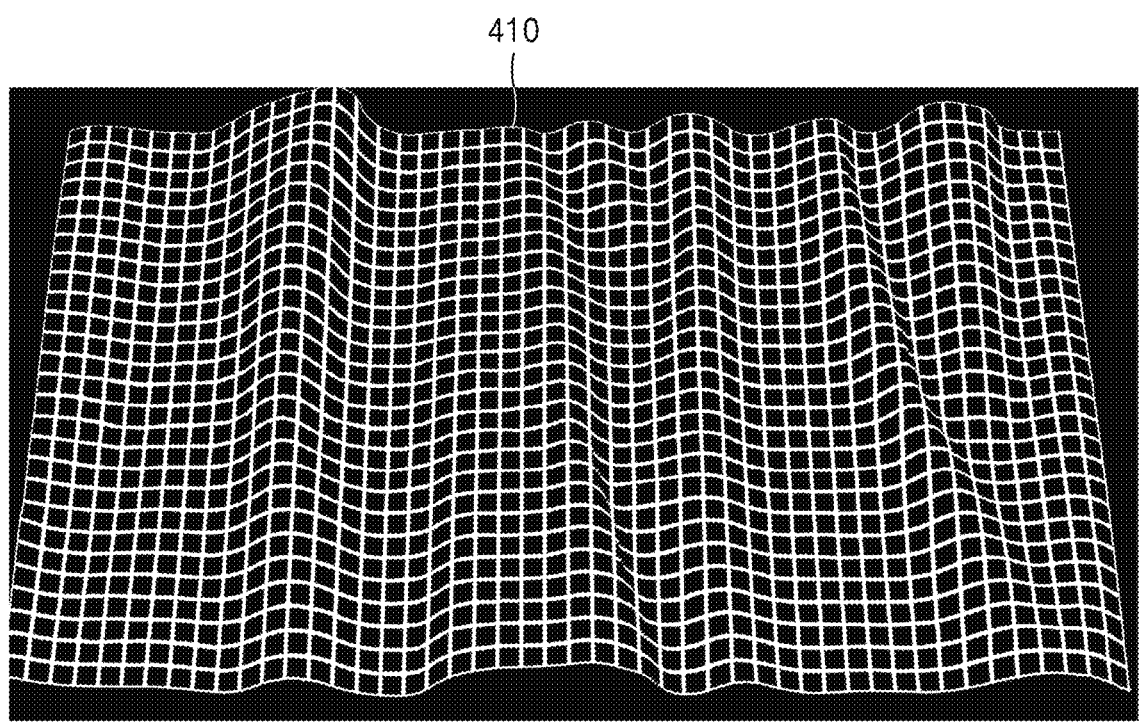
FIG. 4 illustrates a reason for distortion of an image projected by an image projection device according to an embodiment of the disclosure.

FIG. 4 illustrates a reason for distortion of an image projected by an image projection device according to an embodiment of the disclosure.

Referring to FIG. 4, when an image projection device projects an image onto an irregular surface 410, the projected image may be distorted for each area by the irregular surface 410. A distance from the image projection device to the irregular surface 410 may differ for each area of the irregular surface 410. For example, a distance from the image projection device to a concave part of the irregular surface 410 may be longer than a distance from the image projection device to a convex part of the irregular surface 410. Accordingly, the image projected onto the irregular surface 410 may be distorted to be reduced in the concave part and expanded in the convex part.

The projected image may be seen differently depending on the location where a user perceives the projected image. When the image projection device projects an image onto the irregular surface 410, the distortion occurring in the projected image may be perceived to be severer depending on the location of a user. For example, when the location of a user is close to the curve on the irregular surface 410, the distortion occurring in the projected image may be perceived to be severer.

The image projection device 110 according to an embodiment of the disclosure may employ a method to solve the problem shown in FIG. 4.

Figure 5:
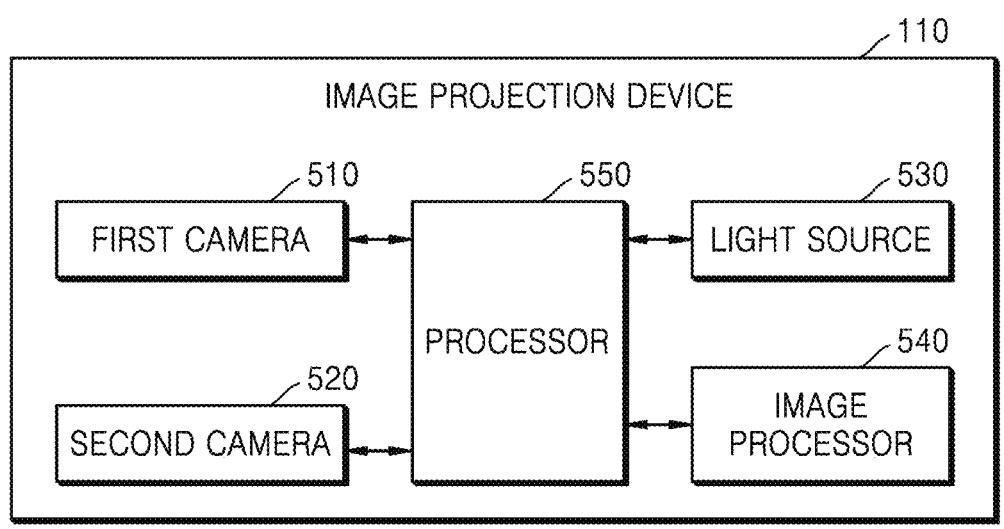
FIG. 5 is a block diagram of an image projection device according to an embodiment of the disclosure.

FIG. 5 is a block diagram of an image projection device according to an embodiment of the disclosure.

Referring to FIG. 5, an image projection device 110 may include a first camera 510, a second camera 520, a light source 530, an image processor 540, and a processor 550.

The first camera 510 may photograph a surface onto which an image is projected by the image projection device 110. The first camera 510 may obtain state information about the state of a surface. For example, the first camera 510 may obtain information about whether the surface is flat or bent, information about the curved shape of a surface, and information about the color of a surface. The first camera 510 may be a red, green, and blue (RGB) camera or an infrared camera.

The second camera 520 may photograph the surface onto which an image is projected by the image projection device 110. The second camera 520 may obtain depth information about the depth of a surface. For example, the second camera 520 may obtain information about a distance from the image projection device 110 to the surface. The second camera 520 may photograph a user. The second camera 520 may obtain information about the location of a user. The second camera 520 may obtain information about the perspective in which a user views a surface. The second camera 520 may be a time of flight (ToF) camera.

The light source 530 may project an image projected by the image projection device 110 onto a surface. The light source 530 may project, onto a surface, optical information to display an image on the surface. The light source 530 may project, onto a surface, a pattern image to measure the shape of a surface and the distance to the surface. The light source 530 may include at least one projector. For example, the light source 530 may include a plurality of projectors that project light including optical information in different directions. The light source 530 may include a sensor module to measure a distance to a surface. For example, the light source 530 may include a light detection and ranging (LiDAR) sensor.

The image processor 540 may generate an image to be projected onto a surface. The image processor 540 may generate an image based on the state information about the state of a surface and the depth information about the depth of a surface. The image processor 540 may generate an image considering the location of a user. The image processor 540 may generate an image considering the bending of a surface, the curved shape of a surface, and the color of a surface. The image processor 540 may compensate for distortion occurring due to the bending of a surface, the curved shape of a surface, and the color of a surface. The image processor 540 may determine the viewpoint of an image considering that the image is perceived at the location of a user.

In an embodiment, the image processor 540 may calculate information about the geometrical structure of a surface onto which an image is projected. The geometrical structure information may include information about the three-dimensional shape of a surface, information about the curve of a surface, and information about the color of a surface. The geometrical structure information may include information about the shape of a surface that is not obtainable by the first camera 510 or the second camera 520. As the image processor 540 calculates information about the geometrical structure of a surface, the image processor 540 may consider even a distortion phenomenon that is not perceived through the first camera 510 or the second camera 520, but is viewed in a projected image when perceived from the user's perspective.

The processor 550 may control the first camera 510, the second camera 520, the light source 530, and the image processor 540. The processor 550 may control the first camera 510 to photograph a surface onto which an image is to be projected. The processor 550 may receive state information about the state of a surface that is obtained by the first camera 510. The processor 550 may control the second camera 520 to photograph a user or a surface onto which an image is to be projected. The processor 550 may receive depth information about the depth of a surface and information about the location of a user, which are obtained by the second camera 520. The processor 550 may control the light source 530 to project optical information onto a surface. The processor 550 may receive information about the shape of a surface and the distance to a surface, which are obtained by the light source 530. The processor 550 may transmit the obtained state information about the state of a surface, depth information about the depth of a surface, and information about the location of a user, to the image processor 540. The processor 550 may receive an image generated by the image processor 540. The processor 550 may control the light source 530 to project the generated image onto a surface.

Figure 6:
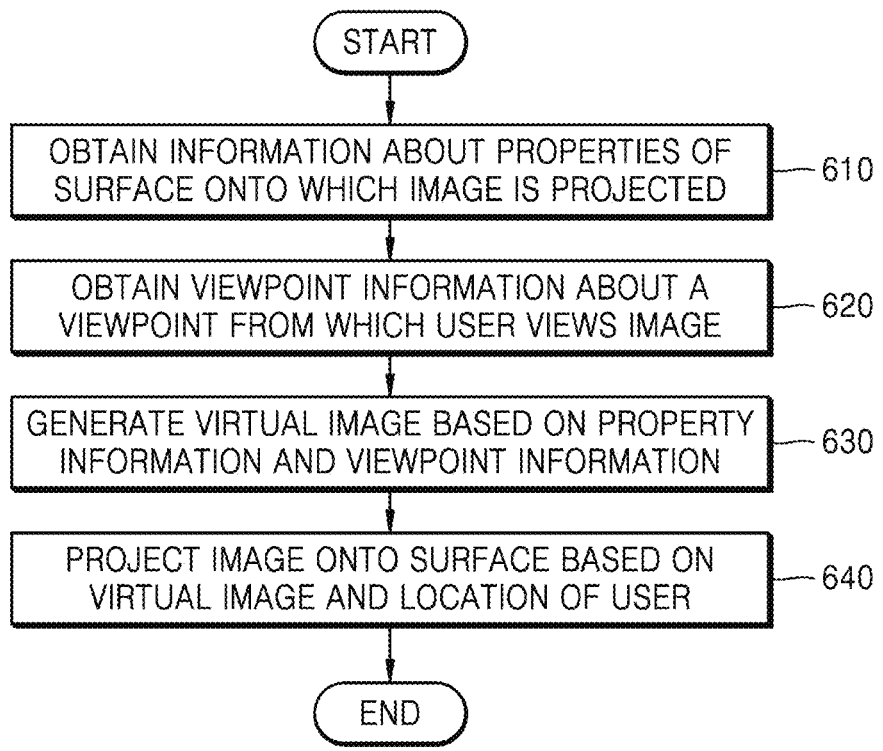
FIG. 6 is a flowchart showing a control method of an image projection device, according to an embodiment of the disclosure.

FIG. 6 is a flowchart of a control method of an image projection device, according to an embodiment of the disclosure.

Referring to FIG. 6, in operation 610, an image projection device 110 according to an embodiment of the disclosure may obtain property information about the properties of a surface onto which an image is projected. The property information about the properties of a surface may include information about a bent part, a curve, or a color of a surface. A surface onto which an image is projected may have a bent part such as a corner part between walls, a curve such as a curtain, or a color. The image projection device 110 may identify a bent part, a curve, and a color in the surface onto which an image is projected. The image projection device 110 may obtain information about a bent part, a curve, and a color in a surface.

In operation 620, the image projection device 110 according to an embodiment of the disclosure may obtain viewpoint information about a viewpoint from which a user views the image. The viewpoint information may include a viewpoint from which a user views an image from the location of the user. The image projection device 110 may detect the location of a user. For example, the image projection device 110 may photograph the location of a user. The image projection device 110 may obtain information about the location of a user. For example, the image projection device 110 may obtain the location of a user as coordinate information. The image projection device 110 may calculate a viewpoint from which a user views an image from the location of a user.

In operation 630, the image projection device 110 according to an embodiment of the disclosure may generate a virtual image based on the property information and the viewpoint information. The image projection device 110 may generate a virtual image to compensate for distortion occurring in an image when projecting the image onto a surface based on the property information. For example, to compensate for a distortion phenomenon in which an image projected onto a surface having a bent part appears to be bent, the image projection device 110 may generate a virtual image in which the bent part is processed to be seamless. For example, to compensate for a distortion phenomenon in which an image projected onto a surface having a curved part appears to be curved, the image projection device 110 may generate a virtual image in which the curved part is processed to be smooth. For example, to compensate for a distortion phenomenon in which an image projected onto a surface having a color appears to be bent, the image projection device 110 may generate a virtual image with an added color effect opposite to the color of the surface.

In operation 640, the image projection device 110 according to an embodiment of the disclosure may project an image onto a surface based on the virtual image and the location of the user. The image projection device 110 may generate an image to be projected onto a surface based on the generated virtual image. The image projection device 110 may consider a viewpoint when an image projected onto a surface is viewed from the location of a user. For example, the image projection device 110 may calculate a distance from the location of a user to a surface and an angle at which the surface is viewed from the location of a user. The image projection device 110 may correct an image to be projected onto a surface by reflecting the distance from the location of a user to a surface and the angle at which the surface is viewed from the location of a user. The image projection device 110 may project a corrected image onto a surface.

Figure 7:
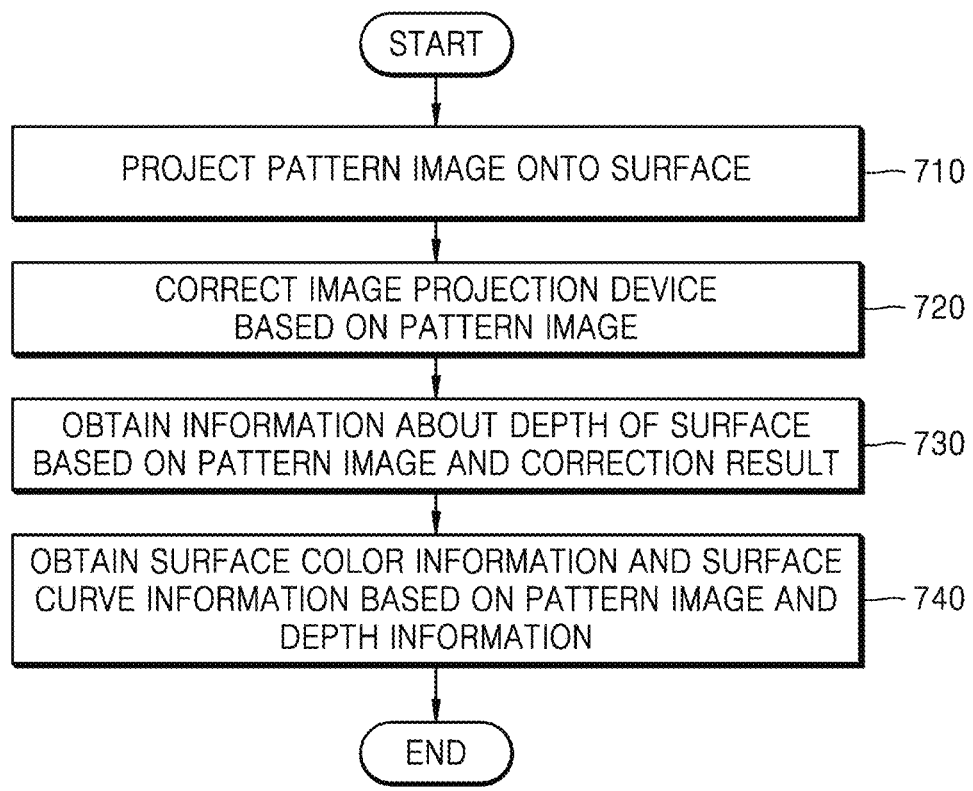
FIG. 7 is a flowchart showing a method of obtaining property information by an image projection device, according to an embodiment of the disclosure.

FIG. 7 is a flowchart showing a method of obtaining property information by an image projection device according to an embodiment of the disclosure.

Referring to FIG. 7, in operation 710, an image projection device 110 according to an embodiment of the disclosure may project a pattern image onto a surface. The pattern image may be a certain image to obtain state information about the state of a surface. For example, the pattern image may be an image including a dot pattern and a stripe pattern to identify the bending of a surface. For example, the pattern image may be an image including a wave pattern to identify a curve of a surface. The image projection device 110 may photograph a pattern image projected onto a surface. The image projection device 110 may compare a pattern image to be originally projected with a pattern image actually projected onto a surface. The image projection device 110 may obtain state information about the state of a surface based on a comparison result.

In operation 720, the image projection device 110 according to an embodiment of the disclosure may correct the image projection device 110 based on the pattern image. The image projection device 110 may obtain state information about the state of a surface based on the pattern image. The image projection device 110 may predict a degree of distortion when an image is projected onto a surface based on the state information about the state of a surface. The image projection device 110 may correct the image projection device 110 based on the prediction result. For example, to compensate for a predicted degreed of image distortion, the image projection device 110 may adjust the intensity, angle, and brightness of the light projected from the image projection device 110. For example, the image projection device 110 may adjust light projected to a portion of an image distorted by a surface by controlling at least some of a plurality of projectors of the image projection device 110.

In operation 730, the image projection device 110 according to an embodiment of the disclosure may obtain depth information about the depth of a surface based on the pattern image and a result of the correction. The image projection device 110 may photograph the pattern image and a pattern image projected onto a surface after correcting the light projected from the image projection device 110. The image projection device 110 may measure a distance from the image projection device 110 to a surface based on the pattern image correction result.

In operation 740, the image projection device 110 according to an embodiment of the disclosure may obtain surface color information and surface curve information based on the pattern image and the depth information. The surface color information may include information about the color of a surface. The surface curve information may include information about the shape of a curve formed on a surface. The image projection device 110 may obtain the shape of a pattern image projected onto a surface. The image projection device 110 may consider depth information in a pattern image projected onto a surface. The image projection device 110 may analyze how a pattern image is distorted by a surface based on the pattern image projected onto a surface and the depth information. The image projection device 110 may identify the color of a surface and the shape of a curve on the surface based on the analysis result. The image projection device 110 may obtain the surface color information and the surface curve information based on the identification result.

Figure 8:
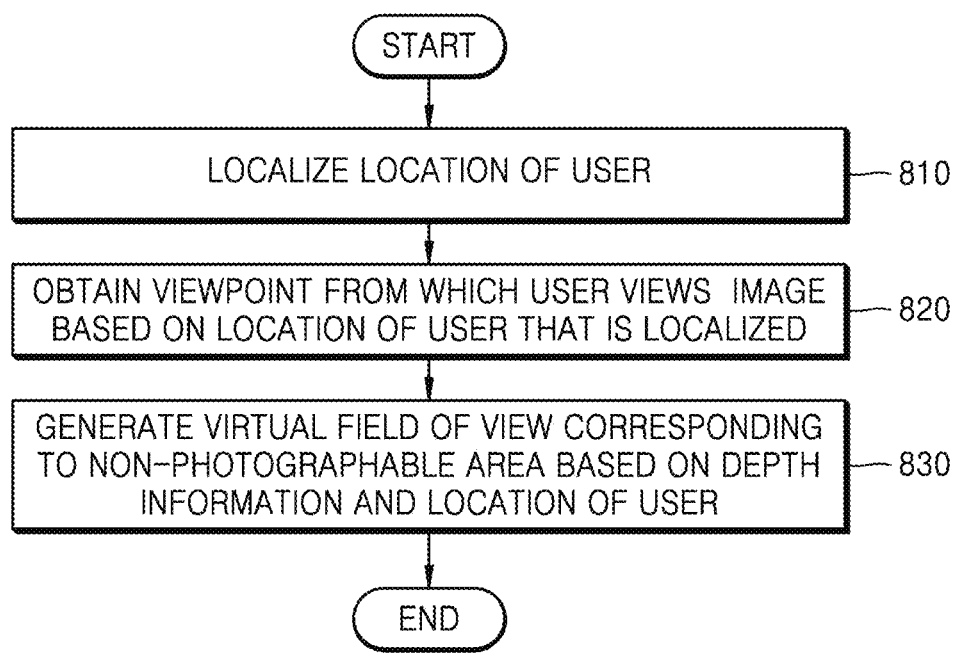
FIG. 8 is a flowchart showing a method of obtaining viewpoint information by an image projection device, according to an embodiment of the disclosure.

FIG. 8 is a flowchart of a method of obtaining viewpoint information by an image projection device according to an embodiment of the disclosure.

Referring to FIG. 8, in operation 810, an image projection device 110 according to an embodiment of the disclosure may localize the location of a user. The image projection device 110 may obtain location information about the location of a user. For example, the image projection device 110 may obtain information about the location of a user by photographing a place where a user exits. For example, the image projection device 110 may obtain information about the location of a user by using a sensor module. For example, the image projection device 110 may receive information about the location of a user obtained by an external device. The image projection device 110 may store information about the location of a user. The image projection device 110 may localize the location of a user based on the stored information about the location of a user. For example, the image projection device 110 may convert the location of a user into a coordinate value with respect to the image projection device 110. The image projection device 110 may localize the location of a user by converting the location of a user into a coordinate value, by using a current location of the image projection device 110 as a reference position.

In operation 820, the image projection device 110 according to an embodiment of the disclosure may obtain a viewpoint from which a user views an image, based on the location of a user that is localized. The image projection device 110 may calculate a distance from the location of a user that is localized to a surface onto which an image is projected. The image projection device 110 may calculate a distance from the location of a user that is localized to a surface onto which an image is projected. For example, the image projection device 110 may calculate a distance from the location of a user to a surface by using an LiDAR sensor. The image projection device 110 may calculate a direction of a viewpoint in which a surface onto which an image is projected is viewed from the location of a user that is localized. For example, the image projection device 110 may photograph and obtain a direction of a user's perspective from the location of a user to a surface. For example, the image projection device 110 may receive a direction from the location of a user toward a surface obtained by an external device. The image projection device 110 may obtain a viewpoint from which a user views an image based on the distance from the location of a user to a surface and the direction from the location of a user toward a surface. The image projection device 110 may predict what an image projected onto a surface looks like from a viewpoint from which a user views the image.

In operation 830, the image projection device 110 according to an embodiment of the disclosure may generate a virtual field of view corresponding to a non-photographable area based on the depth information and the location of a user. The non-photographable area may be a portion in an image projected onto a surface that is not photographable by the image projection device 110. For example, the non-photographable area may be a portion that is not projected due to the state of a surface in an image to be projected onto the surface. For example, the non-photographable area may be a portion located at an angle that is not photographable by a camera included in the image projection device 110 in an image projected onto a surface. The image projection device 110 may assume a case in which an image is viewed from the location of a user based on the information about a distance from the location of a user to a surface information included in the depth information and the location of a user. The image projection device 110 may predict what an image looks like in a non-photographable area by assuming a case in which the image is viewed from the location of a user. The image projection device 110 may generate a virtual field of view corresponding to a non-photographable area based on the prediction result.

Figure 9:
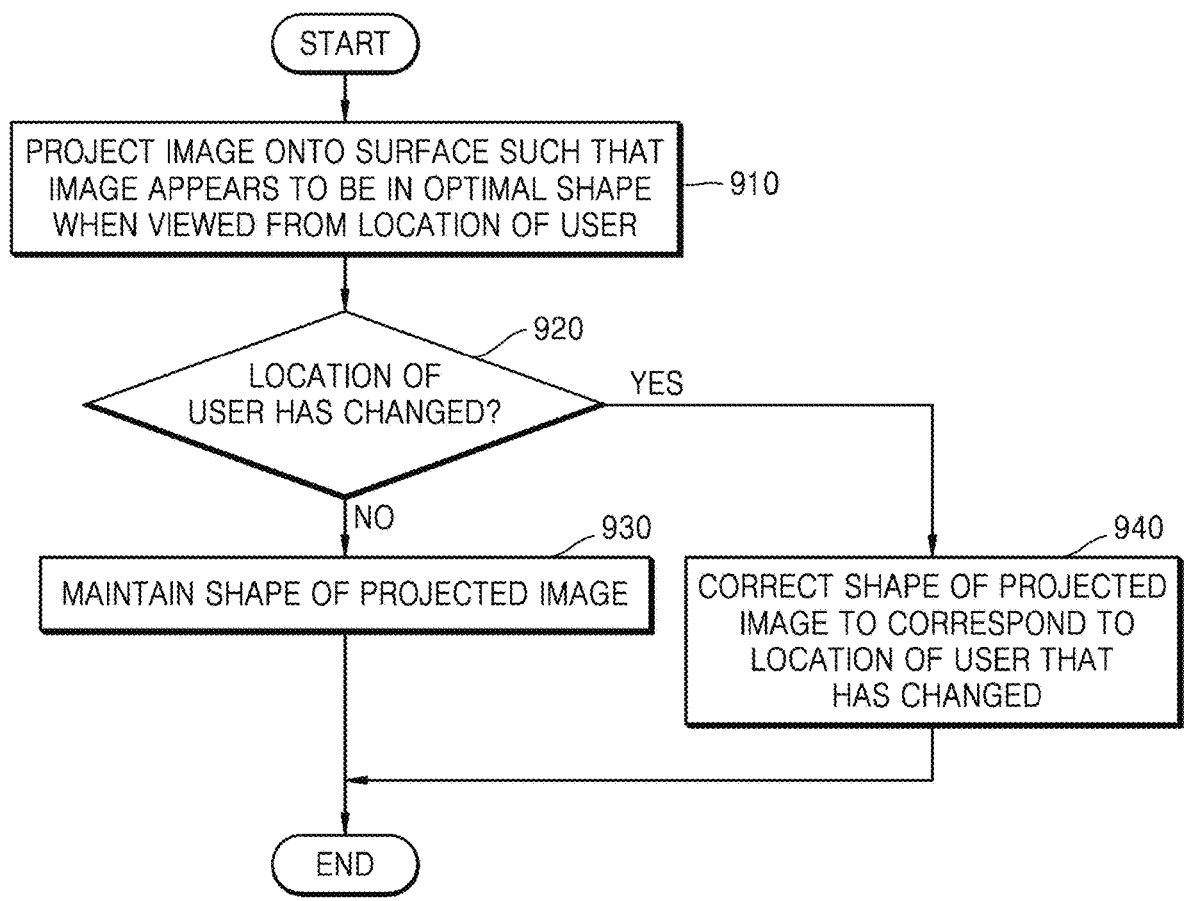
FIG. 9 is a flowchart showing a method of projecting an image by an image projection device, according to an embodiment of the disclosure.

FIG. 9 is a flowchart of a method of projecting an image by an image projection device according to an embodiment of the disclosure.

Referring to FIG. 9, in operation 910, an image projection device 110 according to an embodiment of the disclosure may project an image onto a surface such that the image appears to be in an optimal shape when viewed from the location of a user. The image projection device 110 may generate a virtual field of view showing what an image looks like when viewed from the location of a user. The image projection device 110 may project an image onto a surface based on the virtual field of view.

In operation 920, the image projection device 110 according to an embodiment of the disclosure may identify whether the location of a user has changed. The image projection device 110 may periodically obtain location information about the location of a user. For example, the image projection device 110 may detect the location where a user exists by periodically using an LiDAR sensor. For example, the image projection device 110 may periodically receive location information from an external device. The image projection device 110 may proceed to operation 930 when the location of a user is maintained (NO in operation 920). The image projection device 110 may proceed to operation 940 when the location of a user has changed (YES in operation 920).

In operation 930, the image projection device 110 according to an embodiment of the disclosure may maintain the shape of a projected image. When the location of a user is maintained, the image projection device 110 may maintain the shape of an image that is projected and currently optimized to the location of a user.

In operation 940, the image projection device 110 according to an embodiment of the disclosure may correct the shape of the projected image to correspond to the location of a user that has changed. When the location of a user is changed, the image projection device 110 may generate a virtual field of view corresponding to the location of a user that has changed. The image projection device 110 may correct the shape of the projected image based on the newly generated virtual field of view.

Figure 10:
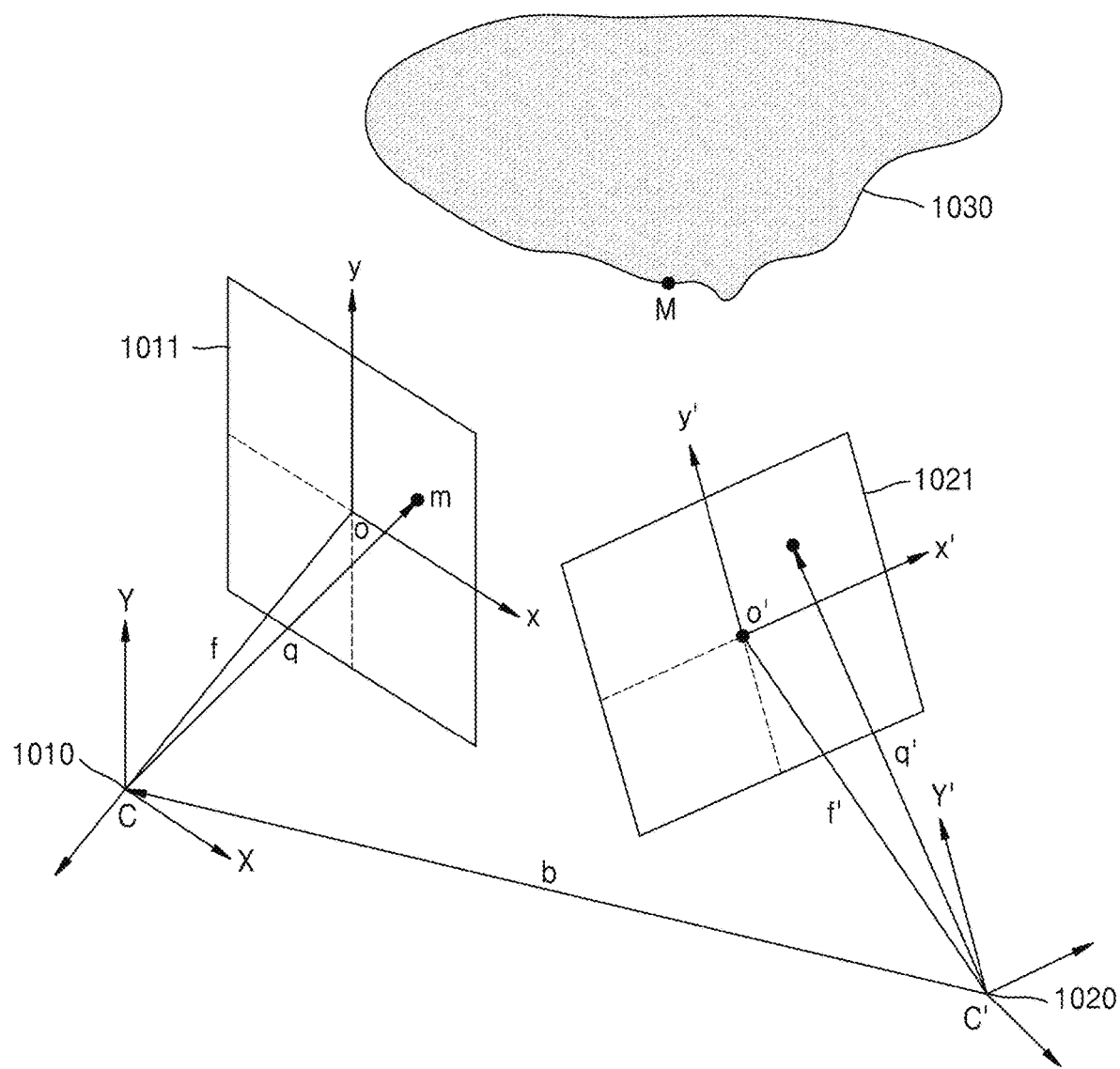
FIG. 10 illustrates calculation of a distance by an image projection device, according to an embodiment of the disclosure.

FIG. 10 illustrates calculation of a distance by an image projection device according to an embodiment of the disclosure.

Referring to FIG. 10, an image projection device 110 may calculate a distance to a surface 1030 onto which an image is projected. The image projection device 110 may perform a system correction to calculate a distance to the surface 1030. The system correction may include an internal correction using each of first and second modules 1010 and 1020 included in the image projection device 110 and an external correction using a spatial relationship between the first and second modules 1010 and 1020. The first and second modules 1010 and 1020 may be two viewpoints to measure a distance from the image projection device 110 to the surface 1030. For example, the first and second modules 1010 and 1020 may be the first camera 510 and the second camera 520, respectively. For example, the first and second modules 1010 and 1020 may be the first camera 510 and the light source 530, respectively. For example, the first and second modules 1010 and 1020 may be the second camera 520 and the light source 530, respectively.

The image projection device 110 may project a pattern image to the surface 1030 onto which an image is projected, by using the first and second modules 1010 and 1020. The pattern image may undergo pixel localization. The pixel localization may be a process in which the pattern image reflected from the surface 1030 is separated into pixel units on first and second virtual surfaces 1011 and 1021, and analyzed. The image projection device 110 may obtain the state information of the surface 1030 and the depth information of the surface 1030 based on a result of the pixel localization of the pattern image. The image projection device 110 may calculate a distance to the surface 1030 based on the state information of the surface 1030 and the depth information of the surface 1030.

The image projection device 110 may calculate user's viewpoint information with respect to the image projection device 110 on a coordinate axis. For example, the image projection device 110 may photograph a user and calculate the location of a user that is photographed, as a coordinate value, using the first and second modules 1010 and 1020 as origins. For example, the image projection device 110 may photograph a user, identify a direction in which the user faces, and calculate the identified direction as a unit vector value. For example, the image projection device 110 may assume a direction in which a user faces, as a direction facing the surface 1030.

Figure 11:
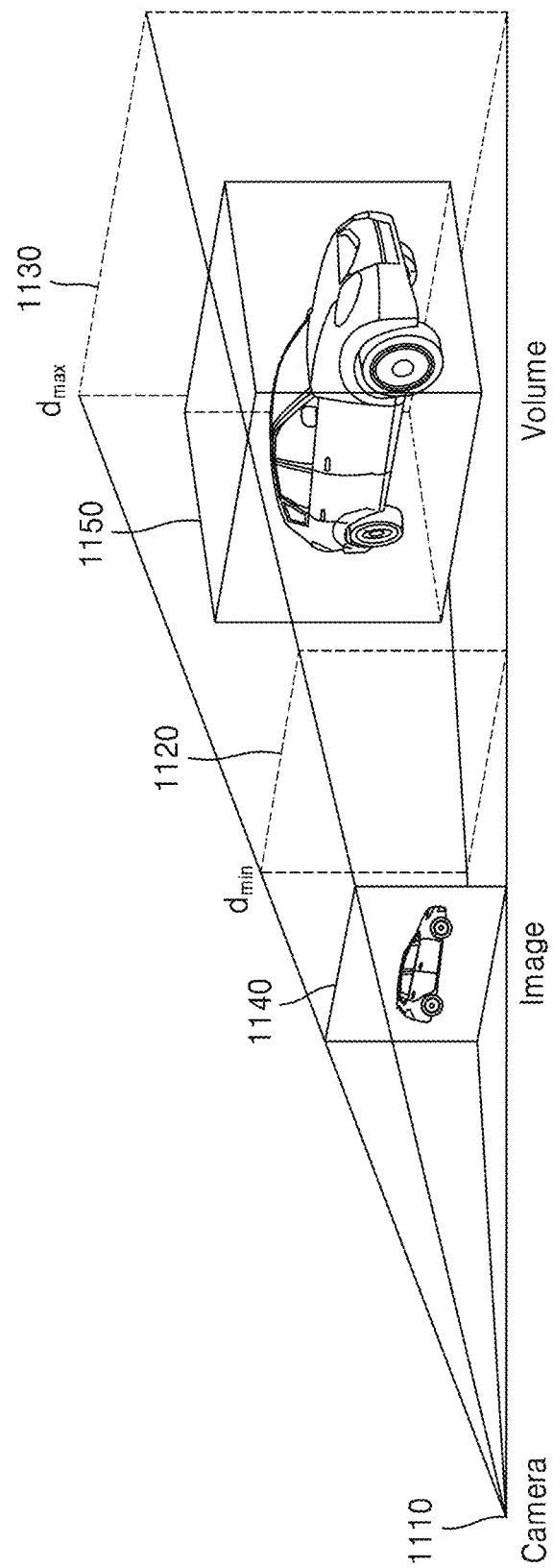
FIG. 11 illustrates generation of a virtual image by an image projection device, according to an embodiment of the disclosure.

FIG. 11 illustrates generation of a virtual image by an image projection device according to an embodiment of the disclosure.

Referring to FIG. 11, an image projection device 110 may project an image to face a surface from a viewpoint 1110. The viewpoint 1110 may include a camera (e.g., the first camera 510 and the second camera 520) and the light source 530. The image projection device 110 may project an image toward a minimum distance surface $d_{min}$ 1120 from the viewpoint 1110. The minimum distance surface $d_{min}$ 1120 may be a minimum distance to project an image onto a surface The image projection device 110 may generate a virtual image 1140 based on the image projected toward the minimum distance surface $d_{min}$ 1120. The image projection device 110 may project an image toward a maximum distance surface $d_{max}$ 1130 from the viewpoint 1110. The maximum distance surface $d_{max}$ 1130 may be a maximum distance at which a user may perceive the image projected onto a surface. The image projection device 110 may generate a virtual volume 1150 based on the image projected toward the maximum distance surface $d_{max}$ 1130.

The image projection device 110 may obtain depth information of at least one of the surfaces 1120 and 1130 when projecting an image. For example, the image projection device 110 may obtain the depth information of at least one of the surfaces 1120 and 1130 by analyzing the pixel distribution of a projected image after projecting a pattern image.

The image projection device 110 may generate a virtual image corresponding to a user's viewpoint and project the virtual image to at least one of the surfaces 1120 and 1130. The image projection device 110 may generate a virtual image corresponding to the user's viewpoint by using the obtained depth information. The image projection device 110 may additionally obtain the information about the location of a user. The image projection device 110 may generate a virtual image to be projected onto at least one of the surfaces 1120 and 1130 to have a shape optimized to the user's viewpoint.

The purpose of the disclosure is to provide an image projection device that reduces the distortion of a projected image even when a surface is irregular and projects an image suitable for a user's viewpoint, and a control method thereof.

The image projection device 110 according to an embodiment of the disclosure may include the first camera 510, the second camera 520, the light source 530, the image processor 540, memory storing one or more computer programs, and one or more processors (e.g., the processor 550) communicatively coupled to the first camera 510, the second camera 520, the light source 530, the image processor 540, and the memory. The one or more computer programs include computer-executable instructions that, when executed by the one or more processors (e.g., the processor 550) individually or collectively, cause the image projection device to, according to an embodiment of the disclosure, obtain property information about properties of a surface onto which an image is projected, obtain viewpoint information about a viewpoint from which a user views the image, generate a virtual image based on the property information and the viewpoint information, and project an image onto a surface based on the virtual image and a location of the user.

The one or more computer programs further include computer-executable instructions that, when executed by the one or more processors (e.g., the processor 550) individually or collectively, cause the image projection device to, according to an embodiment of the disclosure, project a pattern image onto a surface and correct the image projection device 110 based on the pattern image.

The one or more computer programs further include computer-executable instructions that, when executed by the one or more processors (e.g., the processor 550) individually or collectively, cause the image projection device to, according to an embodiment of the disclosure, obtain depth information about the depth of a surface based on the pattern image and a result of the correction, and obtain surface color information and surface curve information based on the pattern image and the depth information.

The one or more computer programs further include computer-executable instructions that, when executed by the one or more processors (e.g., the processor 550) individually or collectively, cause the image projection device to, according to an embodiment of the disclosure, localize the location of a user.

The one or more computer programs further include computer-executable instructions that, when executed by the one or more processors (e.g., the processor 550) individually or collectively, cause the image projection device to, according to an embodiment of the disclosure, generate a virtual field of view corresponding to a non-photographable area based on the depth information and the location of a user.

The one or more computer programs further include computer-executable instructions that, when executed by the one or more processors (e.g., the processor 550) individually or collectively, cause the image projection device to, according to an embodiment of the disclosure, project an image onto a surface such that the image appears to be in an optimal shape when viewed from the location of the user, detect whether the location of the user has changed to a different location, and correct the shape of a projected image to correspond to the different location of the user.

The one or more computer programs further include computer-executable instructions that, when executed by the one or more processors (e.g., the processor 550) individually or collectively, cause the image projection device to, according to an embodiment of the disclosure, calculate a distance to the surface onto which an image is projected, by performing a system correction.

The one or more computer programs further include computer-executable instructions that, when executed by the one or more processors (e.g., the processor 550) individually or collectively, cause the image projection device to, according to an embodiment of the disclosure, obtain state information about a state of the surface and depth information about the depth of the surface, based on a result of the pixel localization of the pattern image, and calculate a distance to the surface based on the state information and the depth information.

The one or more computer programs further include computer-executable instructions that, when executed by the one or more processors (e.g., the processor 550) individually or collectively, cause the image projection device to, according to an embodiment of the disclosure, calculate user's viewpoint information with respect to the image projection device 110 on a coordinate axis.

The one or more computer programs further include computer-executable instructions that, when executed by the one or more processors (e.g., the processor 550) individually or collectively, cause the image projection device to, according to an embodiment of the disclosure, generate the virtual image based on an image projected toward a minimum distance surface, and generate a virtual volume based on an image projected toward a maximum distance surface.

A control method performed by an image projection device according to an embodiment of the disclosure may include obtaining, by the image projection device, property information about properties of a surface onto which an image is projected, obtaining, by the image projection device, viewpoint information about a viewpoint from which a user views the image, generating, by the image projection device, a virtual image based on the property information and the viewpoint information, and projecting, by the image projection device, an image onto a surface based on the virtual image and a location of the user.

The control method according to an embodiment of the disclosure may further include projecting, by the image projection device, a pattern image onto a surface and correcting, by the image projection device, an image projection device based on the pattern image.

The control method according to an embodiment of the disclosure may further include obtaining, by the image projection device, depth information about the depth of a surface based on the pattern image and a result of the correction and obtaining, by the image projection device, surface color information and surface curve information based on the pattern image and the depth information.

The control method according to an embodiment of the disclosure may further include localizing, by the image projection device, the location of a user.

The control method according to an embodiment of the disclosure may further include generating, by the image projection device, a virtual field of view corresponding to a non-photographable area based on the depth information and the location of a user.

The control method according to an embodiment of the disclosure may further include projecting, by the image projection device, an image onto the surface such that the image appears to be in an optimal shape when viewed from the location of the user, detecting, by the image projection device, whether the location of the user has changed to a different location, and correcting, by the image projection device, a shape of the projected image to correspond to the different location of the user.

The control method according to an embodiment of the disclosure may further include calculating, by the image projection device, a distance to the surface onto which the image is projected, by performing a system correction.

The control method according to an embodiment of the disclosure may further include obtaining, by the image projection device, state information about a state of the surface and depth information about the depth of the surface, based on a result of pixel localization of the pattern image, and calculating, by the image projection device, a distance to the surface based on the state information and the depth information.

The control method according to an embodiment of the disclosure may further include calculating, by the image projection device, user's viewpoint information with respect to the image projection device on a coordinate axis.

The control method according to an embodiment of the disclosure may further include generating, by the image projection device, the virtual image based on an image projected toward a minimum distance surface and generating, by the image projection device, a virtual volume based on an image projected toward a maximum distance surface.

The image projection device according to an embodiment of the disclosure, and a control method thereof may compensate for the distortion of a projected image occurring when the surface is irregular, has a curve, or has a color, by projecting an image considering the properties of a surface.

Furthermore, the image projection device according to an embodiment of the disclosure, and a control method thereof, may provide an improved image from the user's perspective by projecting an image suitable for a user's viewpoint considering the user's viewpoint.

The method according to an embodiment of the disclosure may be embodied as program instructions executable by various computer devices, and recorded on a computer-readable medium. The computer-readable medium may include a program command, a data file, a data structure, etc. solely or by combining the same. A program command recorded on the medium may be specially designed and configured for the disclosure or may be a usable one, such as computer software, which is well known to one of ordinary skill in the art to which the disclosure pertains to. Examples of the computer-readable recording medium include magnetic media such as hard disks, floppy disks, or magnetic tapes, optical media such as compact disc read only memories (CD-ROMs) or digital versatile discs (DVDs), magneto-optical media such as floptical disks, and hardware devices such as ROM, random access memory (RAM), and flash memory, which are specially configured to store and execute program instructions. An example of a program command may include not only machine codes created by a compiler, but also high-level programming language executable by a computer using an interpreter.

An embodiment of the disclosure may be embodied in the form of a recording medium including computer executable instructions, such as a program module executed by a computer. A computer-readable storage medium may be a useable medium that is accessible by a computer and may include all of volatile and non-volatile media and separable and inseparable media. Furthermore, the computer-readable medium may include all of computer storage media and communication media. The computer storage media may include all of volatile and non-volatile media and separable and inseparable media, which are embodied by a certain method or technology for storing information such as computer-readable instructions, data structures, program modules, or other data. The communication media may typically include computer-readable instructions, data structures, program modules, or other data of a modulated data signal such as a carrier wave, or other transmission mechanism, and may also include information transmission media. Furthermore, an embodiment of the disclosure may be implemented as a computer program including computer executable instructions, such as a computer program executed by a computer, or a computer program product A computer-readable storage medium may be provided in the form of a non-transitory storage medium. Here, "non-transitory" merely means that the storage media do not contain signals and are tangible, but do not distinguish data being semi-permanently or temporarily stored in the storage media. In an example, a non-transitory storage medium may include a buffer in which data is temporarily stored.

The control method according to an embodiment of the disclosure may be provided by being included in a computer program product. The computer program product as goods may be dealt between a seller and a buyer. The computer program product is distributed in the form of a machine-readable storage medium, for example, compact disc read only memory (CD-ROM), or through application stores or can be distributed directly or online, for example, download or upload, between two user devices, for example, smart phones. In the case of online distribution, at least a part of the computer program product may be at least temporarily stored or temporarily generated in a machine-readable storage medium such as a manufacturer's server, an application store's server, or memory of a relay server.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An image projection device comprising:
a first camera;
a second camera;
a light source;
an image processor;
memory storing one or more computer programs; and
one or more processors communicatively coupled to the first camera, the second camera, the light source, the image processor, and the memory,
wherein the one or more computer programs include computer-executable instructions that, when executed by the one or more processors individually or collectively, cause the image projection device to:
project a pattern image onto a surface,
correct the image projection device based on the pattern image,
obtain property information about properties of the surface onto which the pattern image is projected,
obtain viewpoint information about a viewpoint from which a user views the pattern image, photograph and obtain a direction of a perspective of the user from a location of a user to the surface, localize a location of the user based on the photograph, generate a virtual image based on the property information and the viewpoint information, and project an image onto the surface based on the virtual image and a location of the user.

2. The image projection device of claim 1, wherein the one or more computer programs further include computer-executable instructions that, when executed by the one or more processors individually or collectively, cause the image projection device to:

obtain depth information about a depth of the surface based on the pattern image and a result of the correction, and obtain surface color information and surface curve information based on the pattern image and the depth information.

3. The image projection device of claim 2, wherein the one or more computer programs further include computer-executable instructions that, when executed by the one or more processors individually or collectively, cause the image projection device to:

generate a virtual field of view corresponding to a non-photographable area based on the depth information and the location of the user.

4. The image projection device of claim 2, wherein the one or more computer programs further include computer-executable instructions that, when executed by the one or more processors individually or collectively, cause the image projection device to:

obtain state information about a state of the surface and the depth information about the depth of the surface, based on a result of pixel localization of the pattern image, and calculate a distance to the surface based on the state information and the depth information.

5. The image projection device of claim 1, wherein the one or more computer programs further include computer-executable instructions that, when executed by the one or more processors individually or collectively, cause the image projection device to:

project the image onto the surface such that the image appears to be in an optimal shape when viewed from the location of the user, detect whether the location of the user has changed to a different location, and correct a shape of the projected image to correspond to the different location of the user.

6. The image projection device of claim 1, wherein the one or more computer programs further include computer-executable instructions that, when executed by the one or more processors individually or collectively, cause the image projection device to:

calculate a distance to the surface onto which the image is projected, by performing a system correction.

7. The image projection device of claim 1, wherein the one or more computer programs further include computer-executable instructions that, when executed by the one or more processors individually or collectively, cause the image projection device to:

calculate the viewpoint information of the user with respect to the image projection device on a coordinate axis.

8. The image projection device of claim 1, wherein the one or more computer programs further include computer-executable instructions that, when executed by the one or more processors individually or collectively, cause the image projection device to:

generate the virtual image based on an image projected toward a minimum distance surface, and generate a virtual volume based on an image projected toward a maximum distance surface.

9. A control method performed by an image projection device, the control method comprising:

projecting, by the image projection device, a pattern image onto a surface;

correcting, by the image projection device, the image projection device based on the pattern image;

obtaining, by the image projection device, property information about properties of the surface onto which the pattern image is projected;

obtaining, by the image projection device, viewpoint information about a viewpoint from which a user views the pattern image;

photographing and obtain a direction of a perspective of the user from a location of a user to the surface;

localizing a location of the user based on the photograph;

generating, by the image projection device, a virtual image based on the property information and the viewpoint information; and projecting, by the image projection device, an image onto the surface based on the virtual image and a location of a user.

10. The control method of claim 9, further comprising:

obtaining, by the image projection device, depth information about a depth of the surface based on the pattern image and a result of the correction; and obtaining, by the image projection device, surface color information and surface curve information based on the pattern image and the depth information.

11. The control method of claim 10, further comprising:

generating, by the image projection device, a virtual field of view corresponding to a non-photographable area based on the depth information and the location of the user.

12. The control method of claim 10, further comprising:

obtaining, by the image projection device, state information about a state of the surface and the depth information about the depth of the surface, based on a result of pixel localization of the pattern image; and calculating, by the image projection device, a distance to the surface based on the state information and the depth information.

13. The control method of claim 9, further comprising:

projecting, by the image projection device, the image onto the surface such that the image appears to be in an optimal shape when viewed from the location of the user;

detecting, by the image projection device, whether the location of the user has changed to a different location; and correcting, by the image projection device, a shape of the projected image to correspond to the different location of the user.

14. The control method of claim 9, further comprising:

calculating, by the image projection device, a distance to the surface onto which the image is projected, by performing a system correction.

15. The control method of claim 9, further comprising:

calculating, by the image projection device, the viewpoint information of the user with respect to the image projection device on a coordinate axis.

16. The control method of claim 9, further comprising:
generating, by the image projection device, the virtual image based on an image projected toward a minimum distance surface; and
generating, by the image projection device, a virtual volume based on an image projected toward a maximum distance surface.

* * * * *